3,396,368
ELECTRICAL SIGNALLING ARRANGEMENT FOR CONTROL OF TAPE TRANSMISSION SYSTEM

Azizuddin Hashim Ismail Lakhani, Taplow, England, assignor to British Telecommunications Research Limited, Taplow, England, a British company Filed Aug. 4, 1964, Ser. No. 387,328
Claims priority, application Great Britain, Aug. 9, 1963, 31,601/63
11 Claims. (Cl. 340—146.1)

ABSTRACT OF THE DISCLOSURE

Error detection apparatus for a data transmission system including error detection equipment at the receiving end arranged to transmit a supervisory signal which is interrupted if an error is detected and circuit arrangement for setting a timing device at the transmitting end into operation on detection of an interruption of said signal. If the supervisory signal is again received at the end of the period of the timing device, error correction arrangements become effective at both the transmitting and receiving ends. On the other hand if the absence of the supervisory signal persists after the end of said period, indicating a fault such as a line break, transmission is arrested.

Figure 1:
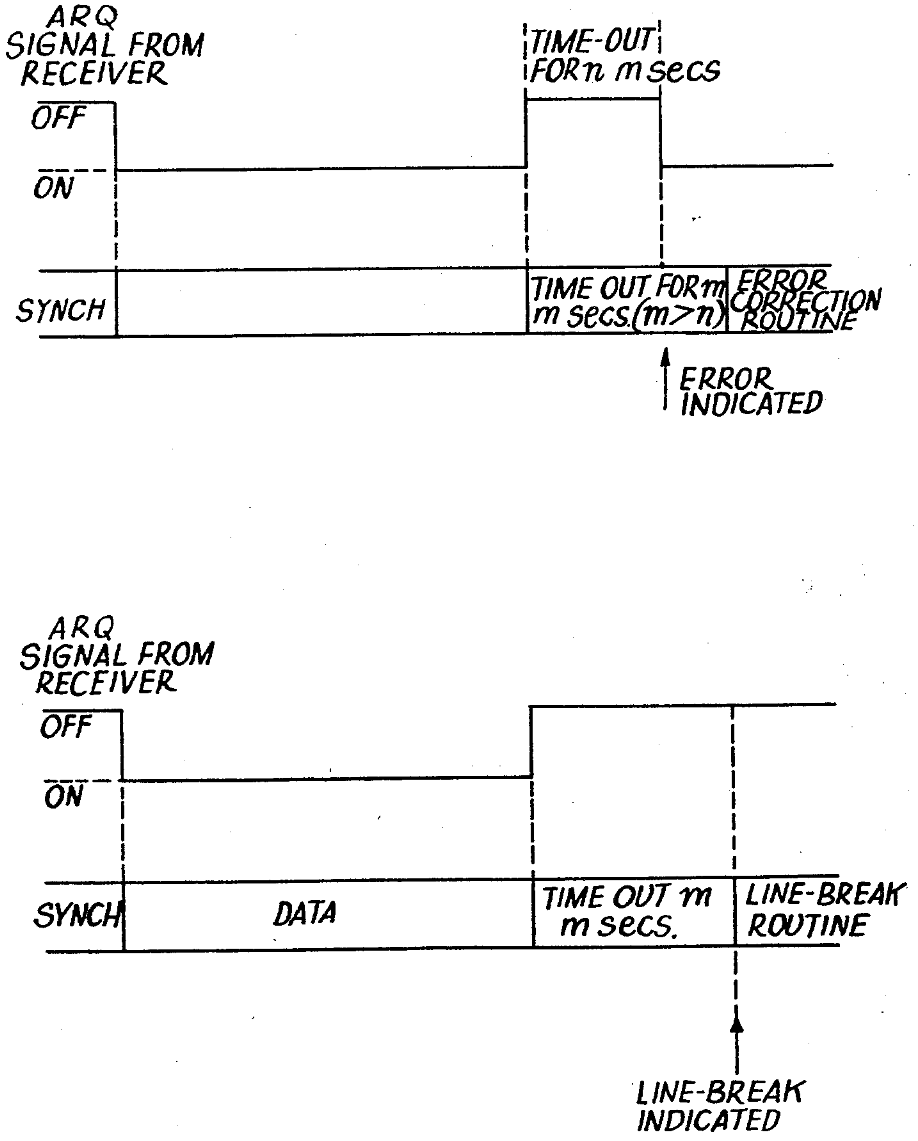

The present invention relates to electrical signalling system and is more particularly concerned with systems suitable for the transmission of data by what may be considered as telegraph practice. This conveniently makes use of a two-condition or binary code in which each element transmitted has one or other of two possible values. Conveniently transmission takes place by suitable modulation of a carrier current.

In systems of this kind where data are transmitted, for instance for the operation of a computer, it is particularly important that there should be a high degree of accuracy in the transmission of the information as errors might vitiate the whole computing operation and moreover they would not be apparent on inspection as might be the case with a plain language telegraph message. Accordingly if any error should occur, for instance due to interference on the signalling channel, this fact should be at once made known so that steps can be taken to correct the error by re-transmission.

Arrangements are already known whereby if a signalling code is used which contains a number of parity bits, error detection can be effected automatically in substantially all cases. It is often convenient for the information which is to be transmitted to be presented in the form of punched paper tape and the corresponding information at the receiving end is also recorded in the form of punched paper tape which may be identical with that at the transmitting end. With this method of operation, arrangements are already known whereby if an error is detected, the tape reader at the transmitting end is stepped backwards far enough to ensure that the incorrectly transmitted character has been reached and then stepping forward is resumed so that the character in question is transmitted correctly if the difficulty has been due to random line disturbance. At the receiving end the reperforator may be arrested and reversed without effecting any punching and then is started again in the forward direction after the appropriate interval, being arranged to resume punching when the retransmitted character is reached. Alternatively, a reversible counting device may be employed at the receiving end and the reperforator is then merely arrested and restarted when correct recording can be resumed.

An arrangement of this general type is disclosed in the Brooke application Ser. No. 243,064 filed Dec. 7, 1962, which matured into Patent 3,263,215 dated July 26, 1966. The said disclosure includes a further modification employing a timing device or counter at the receiving end bearing a special relationship to the counter or timing device at the transmitting end whereby no reversible equipment at all is necessary at the receiving end. The present invention represents an improvement in or modification of the arrangement there claimed. In all the embodiments of that arrangement, use was assumed to be made of a supervisory signal comprising two tones of different frequencies whereby it was possible to transmit an error detection signal and also to transmit a different signal in order to arrest transmission in the event of a line break. The use of two tones however, is undesirable if it can readily be avoided, since it increases the bandwidth necessary and complicates the generating and control equiment. The chief object of the present invention is to provide the same facilities as in the earlier arrangement while making use of only a single tone.

According to the invention, this is brought about by arranging that in the case of an error detection signal, the tone is removed for a predetermined period and at the transmitting end a timing device with a somewhat greater period serves to measure whether the tone is being removed for only this limited period or whether it has been permanently removed which indicates a line break.

Figure 2:
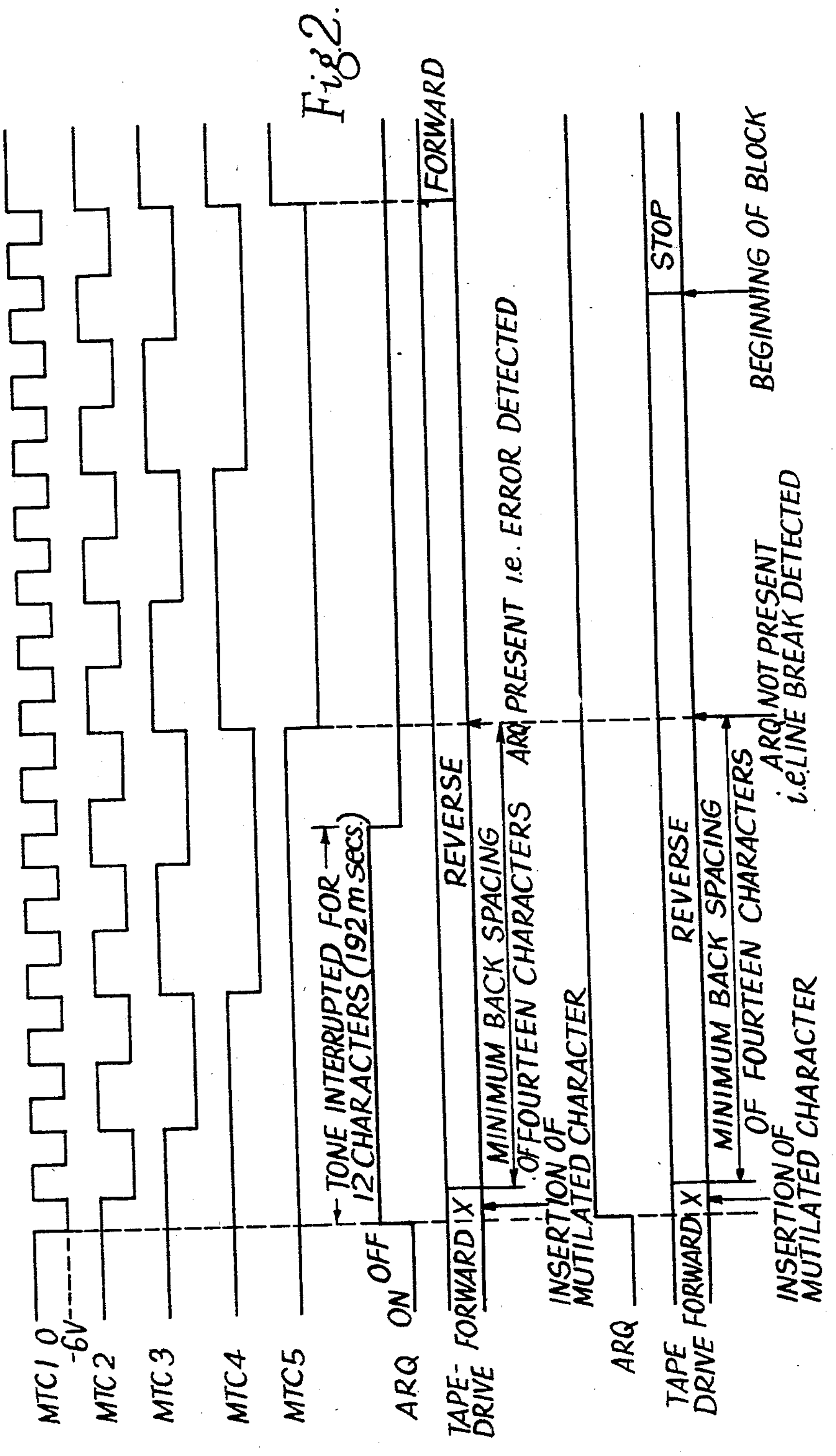
Figure 3:
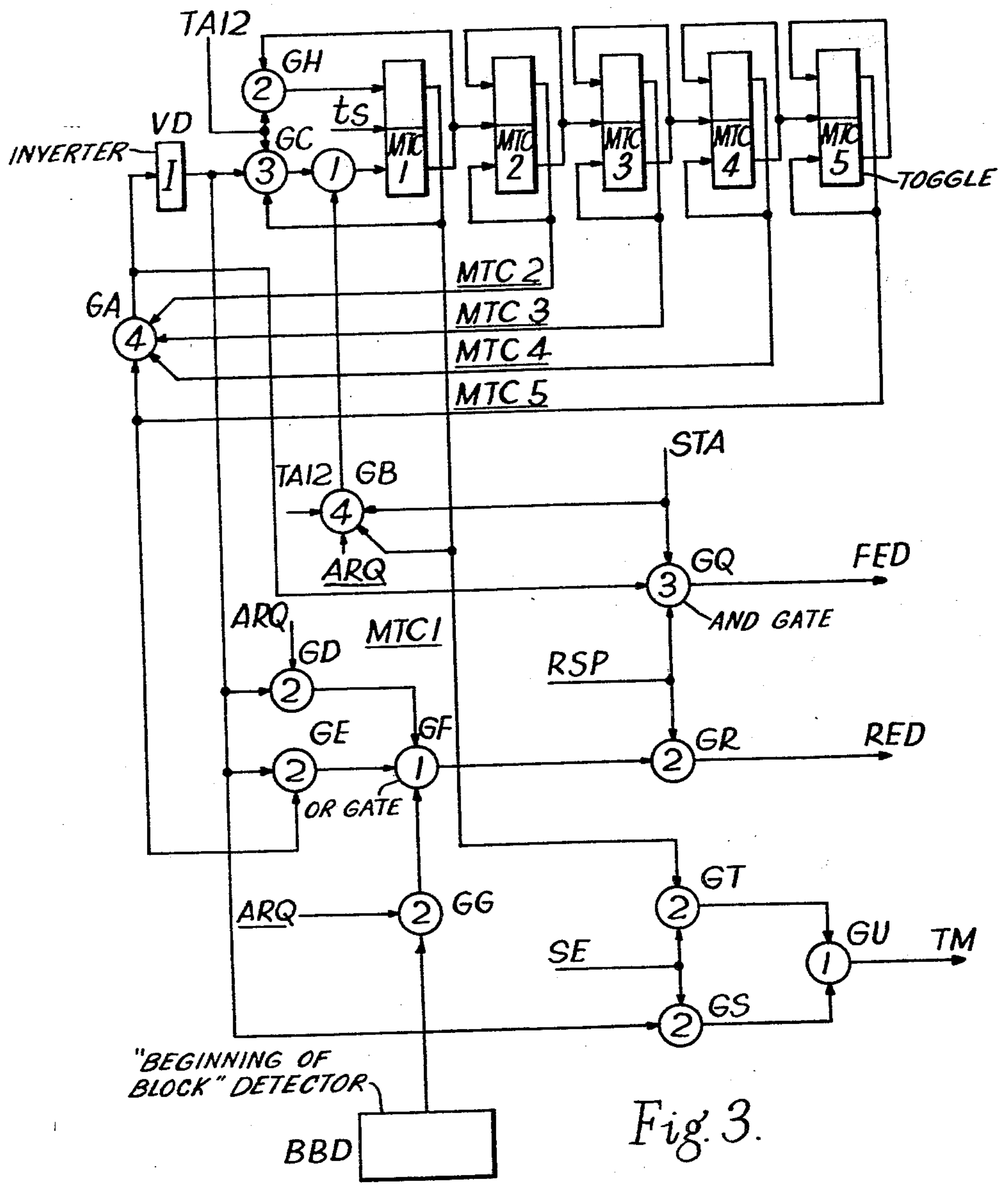
Figure 4:
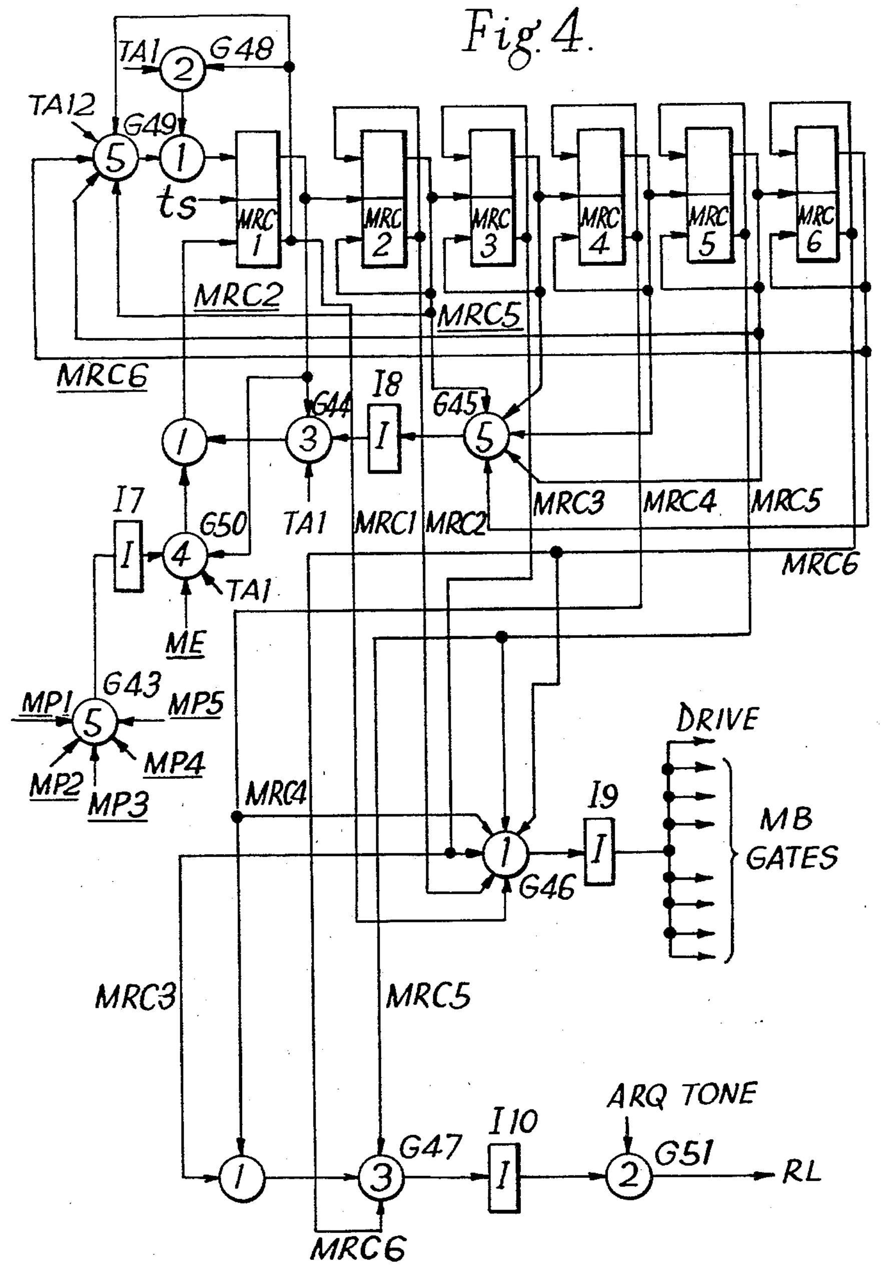

The invention will be better understood from the following description of one method of carrying it into effect which should be taken in conjunction with the accompanying drawings comprising FIGURES 1–4. FIGURE 1 shows timing diagrams for the transmitter in respect of the two comparable cases under consideration to illustrate the principle of operation. FIGURE 2 shows somewhat similar but more comprehensive timing diagrams which include the various members of the counting device, and FIGURE 3 shows details of the logical circuits at the transmitter. FIGURE 4 shows details of the logical circuits at the receiver and it is assumed that the equipment at the receiving end operates in substantially the same manner as disclosed in the earlier application except that the error signal is not a two-frequency tone but rather the removal for a predetermined period of the single frequency signal otherwise present continuously.

In the circuit diagram of FIGURES 3 and 4, the symbol used for logic gates is a circle circumscribing a number. The number defines the minimum number of inputs required to be de-energized to provide an output.

Considering now FIGURE 1 and dealing first with the upper set of curves, it will be assumed that the supervisory sginal, which is referred to as ARQ tone, is transmitted back steadily from the receiver when synchronisation has been effected and it is therefore in order to transmit data. Upon the failure of this tone, the transmitter will respond but will not be in the position to judge initially whether this is due to an error signal being transmitted from the receiver, or whether it is due to a line break. If as shown in the upper part of FIGURE 1, the tone is again received after an interval of $n$ milliseconds, this is an indication that an error signal is intended and as soon as the transmitter has timed its own period of $m$ milliseconds, $m$ being greater than $n$, the necessary action is taken for error correction. If on the other hand the tone has still not been received again at the end of $m$ milliseconds, this indicates a line break and suitable action is then taken to cope with these circumstances.

Referring now to FIGURES 2 and 3, it will be noted that the timing device comprises a set of five bistable devices or so-called toggles MTC1–MTC5 arranged as a counter on a straight binary basis and hence counting up to 32. Normally this counter is quiescent, but as may be seen from the waveform of FIGURE 2, if the supervisory tone disappears, the counter is started up and it is arranged that the tape drives forward for one character and is then reversed. This character is a specially mutilated or "non-parity" character and the purpose of its insertion is to ensure that should the failure of the supervisory tone be due to a line fault so that it will only be transitory, the receiving equipment will be signalled and the whole error correcting cycle carried through. If a genuine error signal has been received, the counter at the receiving end will already have been set in operation to produce this signal and hence the effect of the mutilated character is merely to provide a further circuit for initiating the stepping of the counter which accordingly continues its operation unchanged.

The normal error signal consists in the removal of the tone for a period of 12 characters, but the back-spacing operation continues at least until toggle MTC5 is set so as to give a minimum of fourteen characters back-spacing. This is sufficient to cover amply a period equal to twice the line delay i.e. the time for the transmission of a character which is received in mutilated form and for the resulting transmission back of an error signal.

If at the time toggle MTC5 is set the supervisory tone has been restored as indicated in the upper set of curves, the back-spacing operation continues for another 16 characters until toggle MTC5 is reset. Thereupon forward stepping is resumed and counting arrangements at the receiver as indicated in FIGURE 4 and more fully described in the earlier application ensure that when the original incorrectly transmitted character is reached, punching will be resumed at the receiving end. If on the other hand, as in the lower set of curves, the supervisory tone has not been restored when toggle MTC5 is set, this indicates a line break and the reverse stepping operation continues until the begining of a block of characters is reached. Such a block may consist of any suitable number of characters for instance 100, depending on the nature of the information being transmitted, and it is a convenience that the tape reader should come to rest at the beginning of a block. Manual intervention is now necessary before sending can be resumed.

Referring now to the logic diagram of FIGURE 3, with the toggles all in the reset position, which is the normal state, an input is obtained for the gate GQ by way of gate GA, the other signal components being the reader stepping pulses over RSP and the signal STA which is available if the supervisory tone is present or has not been interrupted for more than 12 characters, i.e. the normal error signal. Accordingly the forward escapement drive by way of FED is in operation and sending is taking place.

If the supervisory tone is now lost, gate GB becomes effective on the next time pulse TA12 and starts the stepping of the counter. Pulse TA12 is the final one of a group of equal pulses TA1–TA12 which follow one another continuously. Each group lasts for 16 milliseconds which is the period corresponding to the transmission of one character. The forward drive is maintained for one character until toggle MTC2 changes over whereupon no further output is obtained from gate GA and hence none from gate GQ. During the time when MTC1 is set but not MTC2, both gates GT and GS are closed and accordingly a blank character is transmitted and this serves the purpose just mentioned of ensuring that the error corrected procedure is carried through if the interruption of the supervisory tone should be only momentary. After this one character, the forward drive ceases and the reverse drive by way of lead RED is effected by way of gates GF, GR and GE which last now receives an input from the inverter VD and also from MTC5. This continues for fourteen characters whereupon MTC5 is set and the circuit just described is opened. This represents the timing operation at the transmitter and if the supervisory tone is again received by the time this period has elapsed, the reverse drive continues to be provided but now over gate GD with inputs VD and ARQ. After a further sixteen characters, the toggles are all reset and an output is again available over gate GA for the forward drive. As described in greater detail in the earlier specification, arrangements are provided to ensure that the punching operation of the reperforator is resumed on the correct character.

If, however, supervisory tone is not again available when MTC5 is set, reverse drive is provided over the gate GG by absence of tone ARQ and a signal from the "beginning of block" detector BBD which provides an input until the beginning of the next block of characters is reached. When this occurs, therefore, stepping ceases but the usual drive over gate GC is still available for returning the counter to zero so that the toggles MTC1–5 are reset. Further forward drive is impossible however because of the absence of the signal STA at gate GQ and similarly the absence of this input to gate GB prevents a further cycle of the counter being initiated. The initial drive for the counter by way of gate GB and the drive for the remainder of the cycle is obtained over gate GA and the inverter VD by way of gate GC. The resetting of toggle MTC1 is effected in every case over gate GH dependent on the time pulse TA12 which determines the speed of operation of the counter. It will be noted that the operation of MTC1 is dependent on the strobes but the remaining toggles are each strobed from the set output of the preceding toggle.

Considering now the receiver logic diagram FIGURE 4, it will be understood that this differs from the arrangement of the earlier application in that it employs six counting toggles MRC1–MRC6 in view of the fact that the period during which the tape reader in the transmitter is stepping in reverse is approximately twice as long as in the earlier arrangement. The toggles MP1–MP5, only the reset outputs from which are shown, respond to the parity bits and if these are all satisfactory, the toggles are all in the reset condition at the end of a character. If this is not the case owing to a transmission error, an output is obtained from the inverter 17 since the gate G43 is closed and a circuit is accordingly completed by way of gate G50 for setting the first toggle MRC1 of the counter and also the remaining toggles MRC2–MRC6 in consequence of the manner in which they are connected. Operation of MRC1 is dependent on the strobe *ts*, but the remaining toggles are each strobed from the reset output of the preceding toggle. The circuit for MRC1 is dependent upon a time pulse TA1, which has the significance already described in connection with the transmitter. The circuit is also dependent on the reset condition of toggle ME which is used for stopping the reperforator apart from any question of error correction, and is not directly concerned with the invention.

Toggle MRC1 is restored by way of gate G48 on the next TA1 pulse, i.e. after one character period, and is then again operated by the following TA1 pulse over its second set circuit, including gate G45, inverter I8 and gate G44. This operating circuit remains effective and accordingly the operation of the binary counting change proceeds in known manner until all the toggles are again reset. There is one modification to this straightforward operation, however, in order than the counter shall reset to zero after 60 rather than after 64 characters. This effect is provided by the additional reset circuit for toggle MRC1 which involves MRC2, MRC5 and MRC6 and gate G49. This circuit produces a resetting operation at time pulse TA12 and then the toggle is immediately reoperated by the usual circuit involving TA1.

As long as one of the counting toggles is operated, the circuit over gate G46 and inverter 19 is cut off for the drive for the reperforator and also parallel circuits over the MB gates for the punch drive magnets so that no punching operation takes place until the counter is restored to normal.

During the period in which MRC5 and MRC6 are both operated and either MRC3 or MRC4, that is for twelve characters at the beginning of the counting operation, an output is obtained from gate G47 and owing to the presence of the inverter I10, gate G51 is closed and consequently ARQ tone is not transmitted over the reverse signalling channel RL. This constitutes the error signal and produces the effects already described at the transmitting end.

It may be pointed out that the effect on the receiver of the deliberately mutilated character will be to give an output from inverter 17 and hence a further set circuit for toggle MRC1 over gate G50. Since however a set circuit is already being provided by way of gate G45, the operation is in no way affected.

It will be appreciated that though the supervisory tone has been referred to as ARQ, this is not necessarily the same as the signal often given this designation which is only present when the receiver is calling for data from a transmitter as in telegraph systems. It can, however, conveniently be arranged that this known signal is in fact employed for the purpose of the invention since it provides the additional facilities without involving any additional tones.

The present invention accordingly provides a significant improvement in the system earlier described without the need for the provision of additional tone signalling equipment with its attendant complication and expense.

I claim:

1. In a signalling system having means including a tape reader for transmitting information recorded on a tape and tape recording means for producing a corresponding record on a tape at the receiving end, error detection means at the receiving end, responsive to an error, for providing a characteristic signal, error correction means at the transmitting and receiving ends respectively, timing means at the transmitting end for measuring a predetermined time period, signal controlled means for setting said timing means in operation on receipt of said characteristic signal, and means controlled by said timing means and responsive to said characteristic signal for actuating said error correction means if the characteristic signal is no longer received at the end of the time period measured by said timing means and for arresting transmission from said tape reader if the characteristic signal persists after the end of said time period 2. The signalling system of claim 1, in which said timing means comprises a series of bistable circuits forming a binary counter.

3. The signalling system of claim 1, in which said error detection means is arranged to transmit a control signal continuously during normal sending, and in which said characteristic signal comprises interruption of said control signal.

4. The signalling system of claim 1, including means for delaying the arrest of transmission until the end of a block of characters.

5. In a signalling system having means including a tape reader for transmitting information recorded on a tape and tape recording means for producing a corresponding record on a tape at the receiving end, error detection means at the receiving end responsive to an error, for transmitting a characteristic signal to said transmitting end, timing means at the transmitting end having a predetermined periodic time, control means at the transmitting end firstly for causing said tape reader to reverse its movement secondly for starting said timing means and finally for reversing the movement of the tape reader back to normal at the end of the periodic time of said timing means, and means operative under the control of said timing means and responsive to said characteristic signal to modify the operation of the tape reader at a predetermined intermediate position in the period of the timing means dependent on whether or not the characteristic signal is still being received.

6. The signalling system of claim 5, in which said timing means comprises a series of bistable circuits forming a binary counter.

7. The signalling system of claim 5, in which said error detection means is arranged to transmit a control signal continuously during normal sending and in which said characteristic signal comprises interruption of said control signal for a predetermined time period.

8. The signalling system of claim 5, in which the period of said timing means is at least twice the line delay period.

9. The signalling system of claim 5, including means for delaying the arrest of transmission until the end of a block of characters.

10. The signalling system of claim 5, including transmission means operative to cause the tape reader to transmit a mutilated character before it is reversed.

11. The signalling system of claim 5, including means at the receiving end for rendering said mutilated character ineffective if the transmission thereof has been due to genuine error signal.

No references cited.

MALCOLM A. MORRISON, *Primary Examiner.*

C. E. ATKINSON, *Assistant Examiner.*